(12) United States Patent
Krauer et al.

(10) Patent No.: US 8,242,739 B2
(45) Date of Patent: Aug. 14, 2012

(54) LEAKAGE CURRENT REDUCTION IN COMBINED MOTOR DRIVE AND ENERGY STORAGE RECHARGE SYSTEM

(75) Inventors: Jean-Pierre Krauer, San Jose, CA (US); Nick Kalayjian, San Carlos, CA (US)

(73) Assignee: Tesla Motors, Inc., Palo Alto, CA (US)

(*) Notice: Subject to any disclaimer, the term of this patent is extended or adjusted under 35 U.S.C. 154(b) by 267 days.

(21) Appl. No.: 12/840,045

(22) Filed: Jul. 20, 2010

(65) Prior Publication Data
US 2012/0019194 A1   Jan. 26, 2012

(51) Int. Cl.
 H02J 7/00 (2006.01)
 H01M 2/10 (2006.01)
 B60K 1/00 (2006.01)
 B60L 1/00 (2006.01)

(52) U.S. Cl. ........ 320/107; 320/104; 320/116; 320/109; 320/139; 429/52; 429/99; 429/100; 180/65.1; 180/65.21; 191/2

(58) Field of Classification Search .................... 320/107
See application file for complete search history.

(56) References Cited

U.S. PATENT DOCUMENTS

| | | | |
|---|---|---|---|
| 7,078,829 B2 * | 7/2006 | Hunninghaus et al. ...... 307/10.6 |
| 2002/0164973 A1 * | 11/2002 | Janik et al. ............... 455/403 |
| 2004/0019441 A1 * | 1/2004 | Larson ...................... 702/63 |
| 2007/0001616 A1 * | 1/2007 | Puccetti et al. ............ 315/169.3 |
| 2007/0178830 A1 * | 8/2007 | Janik et al. ............... 455/3.06 |
| 2008/0284375 A1 * | 11/2008 | Nagaoka et al. ............ 320/116 |
| 2009/0020346 A1 * | 1/2009 | Krauer et al. .............. 180/65.2 |
| 2009/0218986 A1 * | 9/2009 | Jarvinen .................... 320/119 |

* cited by examiner

*Primary Examiner* — Yalkew Fantu
(74) *Attorney, Agent, or Firm* — Patent Law Offices of Michael E. Woods; Michael E. Woods

(57) ABSTRACT

A charging system and method that accommodates and reduces potential residual or leakage current when electrical grounds of a charger and an energy storage system are equalized at the moment of initiating charging. The charging system using an alternating current (AC) line voltage for conductive charging of an energy storage system (ESS) coupled to a polyphase motor drive circuit communicated to a polyphase motor, and converting the line voltage to a charging voltage communicated to the energy storage system using a set of the plurality of driver stages.

5 Claims, 3 Drawing Sheets

LEAKAGE CURRENT REDUCTION IN COMBINED MOTOR DRIVE AND ENERGY STORAGE RECHARGE SYSTEM

BACKGROUND OF THE INVENTION

The invention relates generally to charging of rechargeable energy storage systems (e.g., batteries and electric double-layer capacitors and the like) and more particularly to conductive charging systems that counter a possibility of triggering a residual-current device (RCD) when an external charging power source is coupled to an internal, isolated, energy storage system. In the United States, RCDs are referred to as a ground fault circuit interrupter (GFCI), ground fault interrupter (GFI), an appliance leakage current interrupter (ALCI), or the like.

Energy storage systems used in electric vehicles (EVs) and other industrial applications store significant amounts of energy that is dangerous when improperly handled. Many safety features are adapted and incorporated into these applications to enhance safety. One of those features includes use of an isolated ground for the energy storage system. A person is able to touch both a storage element of the energy storage system and a chassis of the EV without being shocked.

In the case of rechargeable storage elements in the energy storage system, it is common to use an "external" charging system or external source of charging energy (herein, external charging system includes external sources of charging energy) coupled to the energy storage system. For EVs, it is desirable that these charging systems be available at locations that are convenient for the users and operators of those vehicles. Among these locations, the residence of the user is often a prime location for installation of a charging system. Charging systems for EVs, because they provide high energy, are sometimes special installations with particular design considerations. More commonly, it is desirable to provide for the user to simply plug their EV into an AC line voltage plug at their residence to initiate charging. The charging often requires more than an insignificant amount of time, thus the user will "plug" their vehicle into the wall socket and then leave the charging location to occupy their time until the vehicle is charged and they have desire to use the vehicle. It is common for electrical systems of residences to employ an RCD in general, and particularly at the charging location.

This charging system has a ground as well. Because the (+) and (−) of the energy storage system is isolated, the actual voltage level of the (+) and (−) of the energy storage system could be different, and in fact is likely different from, the voltage of the AC phases of the charging system. At the moment that the charging system is coupled to the energy storage system, the relative voltages are equalized to the same voltage. It is this equalization that can result in a current flow that the RCD may detect as an unsafe residual current and disable current flow from the charging station into the energy storage system.

This is inconvenient for the user. The user had left the location of the charging station and is likely unaware that the charging had been suspended. It is the case that returning to the EV after the allotted time with an anticipation of use of the vehicle only to find the state of charge of the energy storage system unchanged may engender a negative reaction in the user. The user must make alternate arrangements to accommodate the situation that the EV is not ready as planned, which can have varying consequences of its own depending upon the nature and availability of alternatives to the EV.

What is needed is a charging apparatus and method that accommodates potential residual current when electrical grounds of the charger and the energy storage system are equalized at the moment of initiating charging.

BRIEF SUMMARY OF THE INVENTION

Disclosed is charging system and method that accommodates/reduces potential residual, also referred to as a leakage, current when electrical grounds of a charger and an energy storage system are equalized at the moment of initiating charging. The charging system using an alternating current (AC) line voltage for conductive charging of an energy storage system (ESS) coupled to a polyphase motor drive circuit communicated to a polyphase motor, the polyphase motor drive circuit including a plurality M of driver stages, one driver stage for each phase of the polyphase motor with each driver stage coupled across the energy storage system, the system including a converter, coupled to the energy storage system and including a number N number of the plurality of driver stages, with N less than M, to convert the line voltage to a charging voltage responsive to a first plurality of drive signals, wherein the charging voltage is communicated to the energy storage system; a switching assembly, coupled between the plurality of driver stages and the line input voltage, controlling communication of the line voltage to the plurality of driver stages, the switching assembly including an on mode that couples the line voltage to the plurality of driver stages and an off mode that decouples the line voltage from the plurality of driver stages; a sensing circuit, coupled to the line voltage and to the energy storage system, measuring an ESS common mode voltage of the energy storage system to a voltage reference and measuring a line common mode voltage of the line voltage to the voltage reference when the switching assembly is in the off mode; a common mode voltage driver, coupled to the energy storage system and to at least one driver stage of the plurality of driver stages, at least one driver stage not including one of the N number of driver stages and responsive to a second set of driver signals to match the ESS common mode voltage with the line common mode voltage when the switching assembly is in the off mode; and a controller, coupled to the plurality of driver stages and responsive to a voltage comparison between the ESS common mode voltage and the line common mode voltage, to provide the second set of driver signals to decrease a difference between the ESS common mode voltage and the line common mode voltage to be within a predetermined value, the controller transitioning the switching assembly from the off mode to the on mode when the difference between the ESS common mode voltage and the line common mode voltage is within the predetermined value, and the controller providing the first set of plurality of drive signals when the switching assembly is in the on mode.

The charging method using an alternating current (AC) line voltage for conductive charging of an energy storage system (ESS) coupled to a polyphase motor drive circuit communicated to a polyphase motor, the polyphase motor drive circuit including a plurality M of driver stages, one driver stage for each phase of the polyphase motor with each driver stage coupled across the energy storage system, the method including the steps of: (a) coupling a first connector providing the line voltage to a second connector coupled to the plurality of driver stages; (b) interrupting selectably the line voltage from communication with the plurality of driver stages; (c) measuring both an ESS common mode voltage of the energy storage system with respect to a voltage reference and a line common mode voltage of the line voltage with respect to the voltage reference while the line voltage communication to the plurality of driver stages is interrupted; (d) operating a particular one of the driver stages to power a common mode voltage driver to align the ESS common mode voltage with the line common mode voltage while the line voltage communication to the plurality of driver stages is interrupted; and thereafter (e) suspending the interrupting step (b) when a difference between aid ESS common mode voltage and the line common mode voltage is less than a first predetermined value, the suspending step (e) communicating the line voltage to the plurality of driver stages; and thereafter (f) converting the line voltage to a charging voltage communicated to the energy storage system using a set of the plurality of driver stages not including the particular one driver stage.

For the system and apparatus, additional sensors may be used to measure residual currents during operation allowing the charging controller to regulate the residual current during operation. This system can be very useful with the large size of batteries causing them to have a large value of capacitance to chassis ground and motors also having large values of capacitance causing the charging system to have a large value of RCD current. This is especially important when using the polyphase motor as the boost inductor because the motor case is normally grounded and it typically has a large capacitance to ground. Other features, benefits, and advantages of the present invention will be apparent upon a review of the present disclosure, including the specification, drawings, and claims.

DETAILED DESCRIPTION OF THE INVENTION

Figure 1:
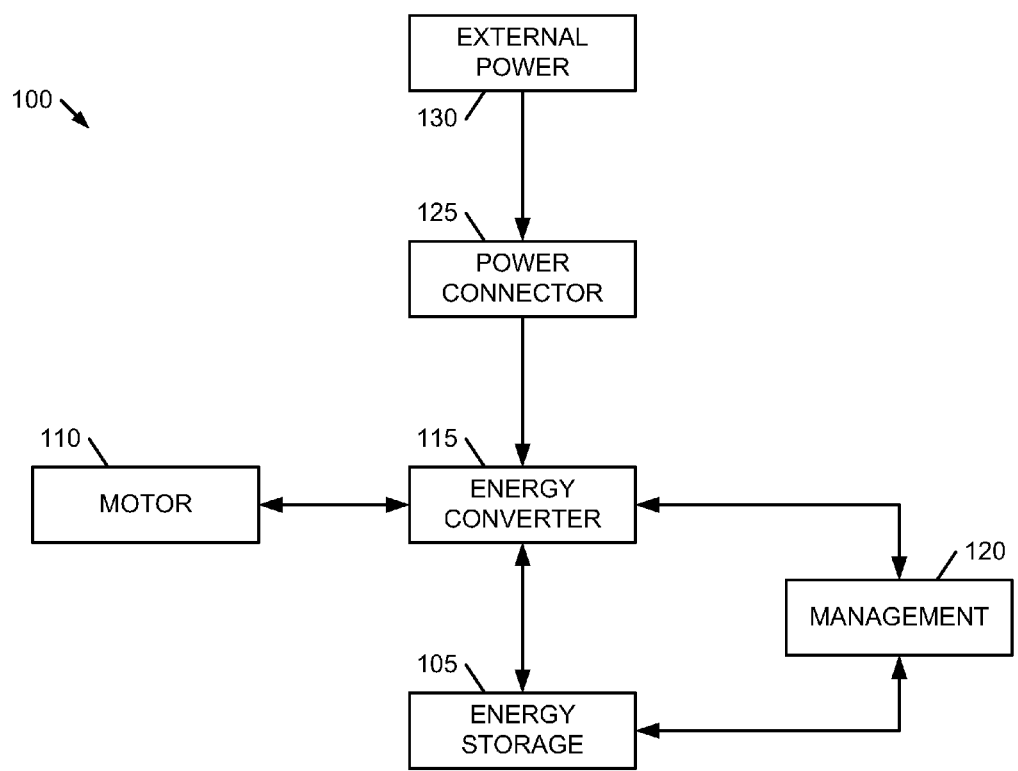
FIG. 1 is a schematic block diagram for a representative electric motor system incorporating a preferred embodiment of the present invention.

Embodiments of the present invention provide methods and systems for a conductive high-energy charger that accommodates potential leakage current when electrical grounds of the charger and the energy storage system are equalized at the moment of initiating charging, and reduces residual currents during charging. The following description is presented to enable one of ordinary skill in the art to make and use the invention and is provided in the context of a patent application and its requirements. In the following text, the terms "energy storage assembly" "battery", "cell", "battery cell" and "battery cell pack" "electric double-layer capacitor" and "ultracapacitor" may be used interchangeably (unless the context indicates otherwise" and may refer to any of a variety of different rechargeable configurations and cell chemistries including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other chargeable high energy storage type/configuration.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Embodiments of the present invention are applicable to systems that employ electric motors in general, and more specifically to vehicles using multiphase electric induction motors. Electric vehicles (EVs) include vehicles that have one or more sources of stored energy designed to provide electrical energy to the vehicle, wherein the electrical energy is used to at least in part to provide some energy used to propel the vehicle. Electric vehicles may include vehicles designed to carry passengers, to transport goods, or to provide specialty work capabilities. For example, electric vehicles include passenger automobiles, trucks, and recreational watercrafts such as boats. In addition, electric vehicles include specialty vehicles, such as fork trucks used to lift and move cargo, vehicles that incorporate conveyor belts to move objects, such as mobile conveyor belt vehicles used to load and unload cargo such as luggage from airplanes, and specialty equipment used in areas where exhaust fumes from typical gasoline, diesel, or propane powered equipment may present hazards to personnel, such as in underground mining operations. In various instances, electric vehicles are designed and intended to be operated on public highways as licensed automobiles, including both cars and trucks. U.S. Pat. No. 5,341,075 titled Combined motor drive and battery recharge system illustrates a combined battery recharge and motor drive system employs an essentially conventional polyphase pulse width modulated (PWM) inverter and a polyphase motor which may be reconnected to operate in a battery recharge mode. Single phase or three-phase AC power from an external source is applied across the reconfigured circuit, and the inverter switches are then controlled to operate as a boost switching regulator. Electrostatic (Faraday) shielding techniques and construction allow extremely small ground currents for improved safety and GFI outlet compatibility. U.S. Pat. No. 5,341,075, issued 23 Aug. 1994, is hereby expressly incorporated in its entirety by reference hereto for all purposes.

Generally, an electric vehicle includes some form of a device or devices capable of storing energy and that is operable to provide electrical power to the vehicle. The electrical power may be used to at least in part provide energy for propelling the vehicle. In some instances, the electrical power is used to provide the energy required for all of the vehicle's functions, including propelling the vehicle. In many instances, the source of the stored energy is a rechargeable battery pack. In various embodiments, a rechargeable battery pack includes a plurality of individual rechargeable battery cells that are electrically coupled to provide a rechargeable battery pack.

FIG. 1 is a schematic block diagram for a representative electric motor system 100 incorporating a preferred embodiment of the present invention. To simplify further discussion, system 100 will be described below in the context of an electric vehicle. However it is understood that system 100 may be part of another device or system other than an electric vehicle. System 100 includes an energy storage system (ESS) 105 that includes a vehicle propulsion battery or the like and at least one propulsion motor 110 for converting energy into mechanical motion, such as rotary motion. ESS 105 includes various components associated with transmitting energy to and from the vehicle propulsion battery in various examples, including safety components, cooling components, heating components, rectifiers, and the like. ESS 105 may be implemented in many different ways and include many different components, but for purposes of this example, ESS includes a propulsion battery, ultracapacitor, or the like. Thus, the present subject matter should not be construed to be limited to the configurations disclosed herein, as other configurations are possible and within the scope of the present invention.

The propulsion battery of ESS 105 of this example includes one or more lithium ion batteries. In some examples, the battery includes a plurality of lithium ion batteries coupled in parallel and/or series. Some examples include cylindrical lithium ion batteries. In some cases, ESS 105 includes one or more batteries compatible with the 18650 battery standard, but the present subject matter is not so limited. Some examples include approximately 2981 batteries which are interconnected. The vehicle propulsion battery used in ESS 105, in some examples, provides approximately 390 volts.

Additionally system 100 includes an energy converter 115. Energy converter 115 converts energy from ESS 105 into energy useable by motor 110. In some instances, there is energy flow from motor 110 into ESS 105 through energy converter 115. ESS 105 transmits energy to energy converter 115, which converts the transmitted energy into energy usable by motor 110 to propel the electric vehicle. Motor 110 may also generate energy that is transmitted to energy converter 115. In these instances, energy converter 115 converts the transmitted energy from motor 110 into energy which may be stored in ESS 105. As shown below in connection with an exemplary FIG. 2 and FIG. 3, energy converter 115 includes semiconductor power devices such as transistors. These transistors may include one or more field effect transistors. Some examples include metal oxide semiconductor field effect transistors. Some examples include one or more insulated gate bipolar transistors. As such, in various examples, the energy converter 115 includes switching elements which are configured to receive direct current (DC) power from ESS 105 and to output multiphase (e.g., three-phase) alternating current (AC) to power motor 110. As noted above, it is sometimes the case that energy converter 115 is configured to convert a three-phase output from motor 110 to DC power to be stored in ESS 105. Some configurations of energy converter 115 convert energy from ESS 105 into energy usable by electrical loads other than motor 110. Some of these examples switch energy from approximately 390 Volts of ESS 105 to 14 Volts (DC).

In this example, motor 110 is a three phase AC motor. Sometimes system 100 may include a plurality of such motors. The vehicle optionally includes a transmission, such as a 2-speed transmission, though other examples are possible. Manually clutched transmissions are contemplated, as are those with hydraulic, electric, or electrohydraulic clutch actuation. Some examples employ a dual-clutch system that, during shifting, phases from one clutch coupled to a first gear to another coupled to a second gear. Rotary motion is transmitted from the transmission to the wheels via one or more axles.

A management system 120 is optionally provided which provides control for one or more of ESS 105 and energy converter 115. In some cases, management system 120 is coupled to a vehicle system which monitors safety (such as a crash sensor). In some examples management system 120 is coupled to one or more driver inputs (such as a speed adjuster, colloquially termed a throttle, although the present subject matter is not limited to examples having an actual throttle). Management system 120 is configured to control power to one or more of ESS 105 and energy converter 115.

A power connector 125 accesses an external power source 130, e.g., a charging station, to receive energy and communicate it with ESS 105 through energy converter 115. In some examples, the charging station converts power from a one or more phase 110V AC power source into power storable by ESS 105. In additional examples, the charging station converts power from a 220V AC power source into power storable by ESS 105. Some implementations include single-phase line voltages while others employ polyphase line voltages. FIG. 1 illustrates an implementation in which energy converter 115 converts power from energy source 130 to energy storable by ESS 105. For purposes of this discussion, power connector 125 is integrated with the EV and external power 130 is external to the EV and provides the input line voltage described herein.

The present example employs conductive charging (as opposed to inductive charging) using the SAE J1772-2001 standard and subsequent revisions, hereby expressly incorporated herein by reference for all purposes, as the charging interface. Most relevant to the present invention are two levels from this standard; Level 1 and Level 2. Level 1 includes 120 V AC and peak current of 16 Amps and Level 2 includes 240 V AC and peak current of 40 Amps, both are single phase. Other implementations may use multiphase input line voltage.

Part of the need for the present invention arises from providing ESS 105 with an isolated ground for improving safety. A user is able to contact a terminal of a storage element of ESS 105 and vehicle chassis without electric shock. This is desirable during operation, but can cause the difficulties described herein when external power 130, having a ground at a different voltage level from that of ESS 105, is coupled to power connector 125.

The present example further includes a Level 1 charging interface for an EV having a nominal 400 VDC energy storage system. Therefore the peak-to-peak voltage of the line input is +/−180 V. The 400 VDC for the ESS results in a +/−200 VDC. Before being coupled together, these two voltages do not have the same reference voltage.

Because the ESS is isolated from the chassis, a largest potential difference between the ESS and the chassis can exist when either of the positive or negative terminals of ESS 105 are close to chassis ground. The voltage of the line input voltage varies sinusoidally and has a largest potential at the peak of the cycle. At the moment that external power 130 is coupled to power connector 125, the ground reference of the line input voltage and the ground reference of the ESS are almost instantly synchronized. In that moment of synchronization, large residual currents may be generated that may trip the RCD of external power 130.

As further explained below, system 100 includes, mostly as part of an input stage of energy converter 115 in the preferred embodiment, actuators that decouple external power 130 from ESS 105. Management 120 includes sensors to measure a common mode voltage between the line input voltage and a reference voltage (e.g., chassis ground) and a common mode voltage between ESS 115 and the reference voltage.

Energy converter 115 includes a plurality of motor driver stages, one driver stage for each phase of polyphase motor 110 (e.g., three phases and three motor driver stages), for operation of motor 110. These driver stages are also used during charging to rectify and convert the voltage of external power 130 to energy storable in ESS 105. Converter 115 requires only two of the driver stages for actual charging, leaving one driver stage "unused" and available.

Embodiments of the present invention use this previously unused driver stage to operate a common mode voltage driver. The common mode voltage driver matches the common mode voltages of external power 130 and ESS 105 to each other (within a predetermined tolerance), and then, the actuators couple external power 130 to ESS 105. The common mode voltage driver may be deactivated after the actual charging has started.

In other embodiments of the present invention, energy converter 115 is provided with residual current sensor, in addition to or in lieu of, the common mode voltage driver. The residual current sensor measures residual currents at power connector 125, these currents are used by management 120 after charging has commenced. The driver stages that actually perform the voltage conversion are controlled to reduce the residual currents to within a desired tolerance. These residual currents can be significant and are preferably measured in real-time because the input voltage is an AC voltage and the average voltage changes sinusoidally (i.e., it is not zero). This produces a 60 Hz varying charging voltage to ESS 115 that can generate residual currents. The charging-related driver stages are controlled to reduce these residual currents to be within a predetermined tolerance. These residual currents may exist during operation because the ESS is isolated from chassis ground and the average of the battery voltage is about equal to the average of the AC line voltage (which is not zero).

Figure 2:
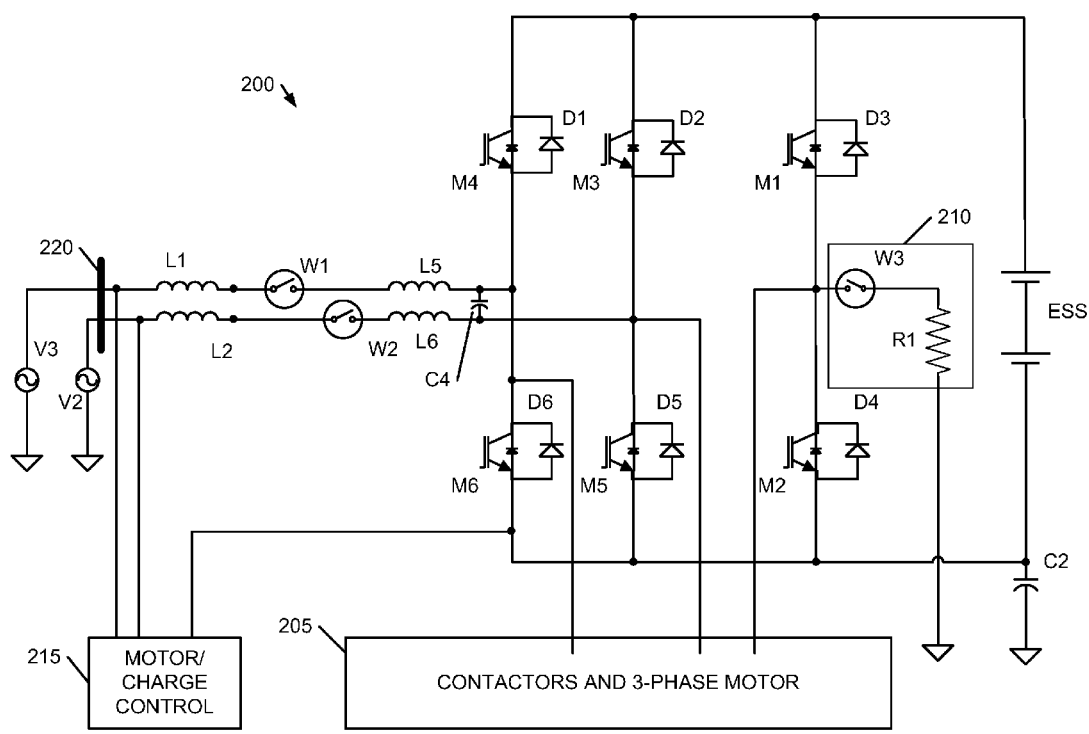
FIG. 2 is a schematic diagram of a conductive charging system for an energy storage system of a multiphase motor including a common mode voltage driver to align ground voltages prior to initiation of charging.

FIG. 2 is a schematic diagram of a conductive charging system 200 for an energy storage system ESS of a multiphase motor 205 including a common mode voltage driver 210 to align ground voltages prior to initiation of charging. System 200 will be described in the context of an electric vehicle using a 3-phase electric induction motor 205, though other implementations are possible. System 200 includes a plurality of semiconductor motor driver stages, one motor driver stage for each phase of motor 205.

Therefore in this example there are three motor driver stages. Each driver stage includes a pair of power transistors (for example transistor M1 and transistor M2, shown as NPN insulated gate bipolar transistors but other transistors may be used) with the emitter of M1 coupled to both the collector of M2 and to one of the power inputs of motor 205. The collector of M1 is coupled to a first terminal (e.g., the positive terminal) of an energy storage system (ESS) and the emitter of M2 is coupled to a second terminal (e.g., the negative terminal) of the ESS. The ESS may include, for example, one or more batteries or ultracapacitors or the like). Each transistor is coupled to a diode, an anode of the diode coupled to the emitter of the transistor and a cathode of the diode coupled to the collector of the transistor. Thus a diode D3 is coupled to M1 and a diode D4 is coupled to M2. The other driver stages include M3 coupled to M5 (with D2 and D5 respectively) and M4/D1 coupled to M6/D6. For operating motor 205, all three driver stages are controlled by a motor/charge control 215 to drive motor 205 using energy from the ESS. The motor driver stages convert the DC voltage of the ESS to the AC voltage required by motor 205.

As noted above, it is desirable to meet reduced budgets for weight, size, cost, and component count, particularly when system 200 is part of an electric vehicle. System 200 uses the semiconductors of the motor driver stages during charging. In some configurations, it is sufficient to provide use the driver stages for charging only. In this configuration, it is sufficient to use two driver stages, for example M4/M6 as a first driver stage and M3/M5 as a second driver stage.

In the charging mode, the line input voltage is 110 V single phase provided from an external power source having a ground reference. A power coupler, shown as a connector 220, communicates external power to system 200. A first node of an inductance L1 is coupled through connector 220 to V3 and a first node of an inductance L2 is coupled through connector 220 to V2. A second node of L1 is coupled to a throw of a switch/actuator W1 and a second node of L2 is coupled to a throw of a switch/actuator W2. A pole of W1 and a pole of W2 are coupled to an input of an EMI filter including a pair of inductances (L5 and L6) and a capacitance C4. A first output node of the EMI filter is coupled to the emitter of M4 and a second output node of the EMI filter is coupled to the emitter of M3.

Common mode voltage driver 210 includes a switch/actuator W3 and a resistance R1. A pole of W3 is coupled to an emitter of M1, a collector of M2, and a winding of motor 305, a throw of W3 is coupled to a first node of R1, and a second node of R1 is coupled to a ground reference voltage, e.g., chassis ground. The value of resistance for R1 used to control the battery voltage relative to chassis reduces the isolation but just during charging when the battery bus is electrically tied to the AC line and the battery is not considered isolated from ground.

Motor/Charge control 215 includes a DC voltage sense coupling to the emitters of M2, M5, and M6 and to the negative terminal of the ESS. Control 215 also includes an AC voltage sense coupling to V2 and V3, through connector 220.

Prior to initiation of charging, with V2/V3 decoupled from connector 220, switches W1, W2, and W3 are all open. When V2/V3 is coupled to connector 220, control 215 measures a common mode voltage of the ESS bus to chassis ground, and a common mode voltage of the AC line voltage relative to chassis ground. When they are not within a predetermined difference (determined by application) from each other, control 215 closes switch W3 and operates the driver stage of M1/M2 to produce a voltage drop across R1 that controls the ESS voltage relative to the chassis ground, moving the measured common mode voltages to the predetermined difference.

When the measured common mode voltages are close enough, control 215 closes W1 and W2 and couples V2/V3 to the charging driver stages. Control 215 then operates the driver stages to initiate charging. Connecting the connector to the energy storage system thus does not produce any residual currents that could trip an RCD coupled to the power source used in charging.

Figure 3:
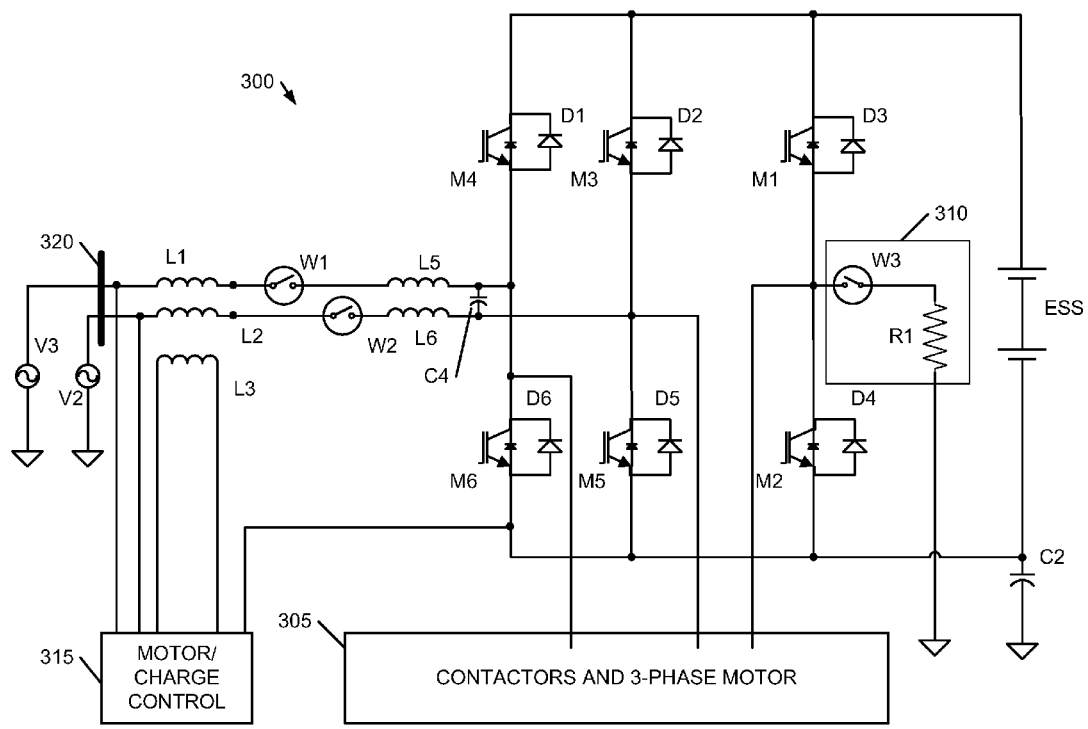
FIG. 3 is a schematic diagram of a conductive charging system for an energy storage system of a multiphase motor including a common mode voltage driver to align ground voltages prior to initiation of charging and a residual current sensor to measure and reduce residual currents during charging.

FIG. 3 is a schematic diagram of a conductive charging system 300 for an energy storage system (ESS) of a multiphase motor 305 including a common mode voltage driver 310 to align ground voltages prior to initiation of charging and a residual current sensor to measure and reduce residual currents during charging. Charging system is configured and operates similarly to system 200 shown in FIG. 2 and described above. System 300 further includes a residual current sensor, e.g., an inductance L3 magnetically coupled to L1 and L2 for measuring residual currents during operation. Control 315, coupled to inductance L3, operates the charging motor driver stages to maintain the residual currents within predetermined target values. The added residual current sensor reduces a possibility of errant tripping of an RCD during operation of charging system 300.

System 300 will be described in the context of an electric vehicle using a 3-phase electric induction motor 305, though other implementations are possible. System 300 includes a plurality of semiconductor motor driver stages, one motor driver stage for each phase of motor 305.

Therefore in this example there are three motor driver stages. Each driver stage includes a pair of power transistors (for example transistor M1 and transistor M2, shown as NPN insulated gate bipolar transistors but other transistors may be used) with the emitter of M1 coupled to both the collector of M2 and to one of the power inputs of motor 305. The collector of M1 is coupled to a first terminal (e.g., the positive terminal) of an energy storage system (ESS) and the emitter of M2 is coupled to a second terminal (e.g., the negative terminal) of the ESS. The ESS may include, for example, one or more batteries or ultracapacitors or the like). Each transistor is coupled to a diode, an anode of the diode coupled to the emitter of the transistor and a cathode of the diode coupled to the collector of the transistor. Thus a diode D3 is coupled to M1 and a diode D4 is coupled to M2. The other driver stages include M3 coupled to M5 (with D2 and D5 respectively) and M4/D1 coupled to M6/D6. For operating motor 305, all three driver stages are controlled by a motor/charge control 315 to drive motor 305 using energy from the ESS. The motor driver stages convert the DC voltage of the ESS to the AC voltage required by motor 305.

As noted above, it is desirable to meet reduced budgets for weight, size, cost, and component count, particularly when system 300 is part of an electric vehicle. System 300 uses the semiconductors of the motor driver stages during charging. In some configurations, it is sufficient to provide only a boost-mode for charging. In this boost-mode-only configuration, it is sufficient to use two driver stages, for example M4/M6 as a first driver stage and M3/M5 as a second driver stage.

In the charging mode, the line input voltage is 110 V single phase provided from an external power source having a ground reference. A power coupler, shown as a connector 320, communicates external power to system 300. A first node of an inductance L1 is coupled through connector 320 to V3 and a first node of an inductance L2 is coupled through connector 320 to V2. A second node of L1 is coupled to a throw of a switch/actuator W1 and a second node of L2 is coupled to a throw of a switch/actuator W2. A pole of W1 and a pole of W2 are coupled to an input of an EMI filter including a pair of inductances (L5 and L6) and a capacitance C4. A first output node of the EMI filter is coupled to the emitter of M4 and a second output node of the EMI filter is coupled to the emitter of M3.

Common mode voltage driver 310 includes a switch/actuator W3 and a resistance R1. A pole of W3 is coupled to an emitter of M1, a collector of M2, and the winding of motor 305 contactor is opened to disconnect motor 305 during charging. A throw of W3 is coupled to a first node of R1 and a second node of R1 is coupled to a ground reference voltage, e.g., chassis ground. The value of resistance for R1 used to control the battery voltage relative to chassis reduces the isolation but just during charging when the battery bus is electrically tied to the AC line and the battery is not considered isolated from ground.

Motor/Charge control 315 includes a DC voltage sense coupling to the emitters of M2, M5, and M6 and to the negative terminal of the ESS. Control 315 also includes an AC voltage sense coupling to V2 and V3, through connector 320.

Prior to initiation of charging, with V2/V3 decoupled from connector 320, switches W1, W2, and W3 are all open. When V2/V3 is coupled to connector 320, control 315 measures a common mode voltage of the ESS bus to chassis ground, and a common mode voltage of the AC line voltage relative to chassis ground. When they are not within a predetermined difference (determined by application) from each other, control 315 closes switch W3 and operates the driver stage of M1/M2 to produce a voltage drop across R1 that controls the ESS voltage relative to the chassis ground, moving the measured common mode voltages to the predetermined difference.

When the measured common mode voltages are close enough, control 315 closes W1 and W2 and couples V2/V3 to the charging driver stages. Control 315 then operates the driver stages to initiate charging. Connecting the connector to the energy storage system thus does not produce any residual currents that could trip an RCD coupled to the power source used in charging.

It may be desirable in some instances to combine embodiments of the present invention with a ground detect mechanism to improve safety of operation and to reduce false trips of an RCD. Further, as noted herein, in typical operation the polyphase motor is disconnected from the driver/inverter stages) in the case when separate boost inductances are used from the inductances of the polyphase motor. Contactors in subsystem 205/305 are used to switch the motor (and the inductances) as necessary or desirable. As also noted, it is possible in some cases to use inductances of the polyphase motor as the boost inductance(s) and minimizing/eliminating separate inductances. In such cases, the polyphase motor will not be completely disconnected from the inverters during the disclosed operations. The phase of the polyphase motor that is used to reduce the RCD current is always disconnected from the polyphase motor using contactors in subsystem 205/305.

The system above has been described in the preferred embodiment of charging a multicell energy storage module used in electric vehicle (EV) systems. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A charging system using an alternating current (AC) line voltage for conductive charging that reduces potential residual or leakage current, and an energy storage system (ESS) coupled to a polyphase motor drive circuit communicated to a polyphase motor, the polyphase motor drive circuit including a plurality M of driver stages, one driver stage for each phase of the polyphase motor with each driver stage coupled across the energy storage system, the system comprising: a converter, coupled to the energy storage system and including a number N number of the plurality of driver stages, with N less than M, to convert the line voltage to a charging voltage responsive to a first plurality of drive signals, wherein said charging voltage is communicated to the energy storage system; a switching assembly, coupled between the plurality of driver stages and the line input voltage, controlling communication of the line voltage to the plurality of driver stages, said switching assembly including an on mode that couples the line voltage to the plurality of driver stages and an off mode that decouples the line voltage from the plurality of driver stages; a sensing circuit, coupled to the line voltage and to the energy storage system, measuring an ESS common mode voltage of the energy storage system to a voltage reference and measuring a line common mode voltage of the line voltage to said voltage reference when said switching assembly is in said off mode; a common mode voltage driver, coupled to the energy storage system and to at least one driver stage of said plurality of driver stages, said at least one driver stage not including one of said N number of driver stages and responsive to a second set of driver signals to match said ESS common mode voltage with said line common mode voltage when said switching assembly is in said off mode; and a controller, coupled to said plurality of driver stages and responsive to a voltage comparison between said ESS common mode voltage and said line common mode voltage, to provide said second set of driver signals to decrease a difference between said ESS common mode voltage and said line common mode voltage to be within a predetermined value, said controller transitioning said switching assembly from said off mode to said on mode when said difference between said ESS common mode voltage and said line common mode voltage is within said predetermined value, and said controller providing said first set of plurality of drive signals when said switching assembly is in said on mode.

2. The charging system of claim 1 wherein said common mode voltage driver includes a resistance coupling said at least one driver stage to said voltage reference.

3. The charging system of claim 1 further comprising a current sensor, coupled to said controller and to an input of said converter receiving the line voltage, to measure a ground residual-current device (RCD) current flow wherein said controller provides said first set of driver signals to regulate said ground RCD current flow to be less than a second predetermined value.

4. A charging method using an alternating current (AC) line voltage for conductive charging that reduces potential residual or leakage current, and an energy storage system (ESS) coupled to a polyphase motor drive circuit communicated to a polyphase motor, the polyphase motor drive circuit including a plurality M of driver stages, one driver stage for each phase of the polyphase motor with each driver stage coupled across the energy storage system, the method comprising the steps of: (a) coupling a first connector providing the line voltage to a second connector coupled to the plurality of driver stages; (b) interrupting selectably the line voltage from communication with the plurality of driver stages; (c) measuring both an ESS common mode voltage of the energy storage system with respect to a voltage reference and a line common mode voltage of the line voltage with respect to said voltage reference while the line voltage communication to the plurality of driver stages is interrupted; (d) operating a particular one of the driver stages to power a common mode voltage driver to align said ESS common mode voltage with said line common mode voltage while the line voltage communication to the plurality of driver stages is interrupted; and thereafter (e) suspending said interrupting step (b) when a difference between aid ESS common mode voltage and said line common mode voltage is less than a first predetermined value, said suspending step (e) communicating the line voltage to the plurality of driver stages; and thereafter (f) converting the line voltage to a charging voltage communicated to the energy storage system using a set of the plurality of driver stages not including said particular one driver stage.

5. The charging method of claim 4 further comprising the step of:
(g) measuring, during converting step (f), ground RCD current flow through said connectors;
(h) regulating said ground RCD current flow to be less than a second predetermined value using said set of driver stages.

* * * * *